United States Patent
Engelman et al.

(10) Patent No.: US 7,403,297 B2
(45) Date of Patent: *Jul. 22, 2008

(54) PRINTING SYSTEM THAT MANAGES FONT RESOURCES USING SYSTEM INDEPENDENT RESOURCE REFERENCES

(75) Inventors: Jeffery A. Engelman, Mead, CO (US); Reinhard H. Hohensee, Boulder, CO (US); Terry S. Luebbe, Mantorville, MN (US); Melanie S. Phares, Longmont, CO (US); Jeri L. Sampson, Boulder, CO (US); David E. Stone, Longmont, CO (US)

(73) Assignee: Infoprint Solutions Company, LLC, Boulder, CO (US)

( * ) Notice: Subject to any disclaimer, the term of this patent is extended or adjusted under 35 U.S.C. 154(b) by 910 days.

This patent is subject to a terminal disclaimer.

(21) Appl. No.: 10/697,521

(22) Filed: Oct. 30, 2003

(65) Prior Publication Data

US 2005/0094173 A1   May 5, 2005

(51) Int. Cl.
*G06F 15/00* (2006.01)
(52) U.S. Cl. ............... 358/1.11; 358/1.17; 358/1.15; 345/467; 345/471; 345/469; 395/114; 395/110; 395/150; 395/151
(58) Field of Classification Search ............... None
See application file for complete search history.

(56) References Cited

U.S. PATENT DOCUMENTS

| | | | | |
|---|---|---|---|---|
| 5,138,696 A | * | 8/1992 | Nagata ............... | 358/1.11 |
| 5,533,174 A | * | 7/1996 | Flowers et al. ....... | 358/1.15 |
| 5,542,050 A | * | 7/1996 | Onozawa ............. | 358/1.11 |
| 5,644,684 A | * | 7/1997 | Nishiyama ........... | 358/1.11 |
| 5,748,884 A | * | 5/1998 | Royce et al. ......... | 714/57 |
| 5,859,648 A | * | 1/1999 | Moore et al. ......... | 345/471 |
| 5,877,776 A | * | 3/1999 | Beaman et al. ....... | 345/472 |
| 5,926,189 A | * | 7/1999 | Beaman et al. ....... | 345/467 |

(Continued)

FOREIGN PATENT DOCUMENTS

JP   2000289267 A   10/2000

OTHER PUBLICATIONS

"Dynamic font customization method through extracting/re-constructing subsets," *IBM Research Disclosure*, Aug. 2000, 1493, 2 pages.

*Primary Examiner*—Twyler L. Haskins
*Assistant Examiner*—Pawandeep S Dhingra
(74) *Attorney, Agent, or Firm*—Duft Bornsen & Fishman, LLP

(57) ABSTRACT

A method, computer program product and system for managing font resources using system independent references. A resource library may store a table, referred to herein as the "resource access table" that contains an entry for each base font resource. Each entry may include the following information on a base font resource: a native name, a file name, a unique identification, attributes, and possibly a link list used to identify any font resources that are linked to the base font resource. Since changes to the resource file such as updating a version of a font resource, changing the attributes of the font resource or changing the font resource's linked fonts, simply require an update to the resource access table, the data stream and the application program generating that data stream does not have to be changed.

8 Claims, 10 Drawing Sheets

U.S. PATENT DOCUMENTS

| | | | |
|---|---|---|---|
| 6,043,826 A * | 3/2000 | Manning | 345/467 |
| 6,073,147 A * | 6/2000 | Chan et al. | 715/234 |
| 6,252,671 B1 * | 6/2001 | Peng et al. | 358/1.11 |
| 6,317,217 B1 * | 11/2001 | Toda | 358/1.11 |
| 6,552,728 B1 * | 4/2003 | Moore et al. | 345/471 |
| 6,603,478 B1 * | 8/2003 | Kuo et al. | 345/467 |
| 6,614,541 B1 * | 9/2003 | Fritz et al. | 358/1.11 |
| 6,771,267 B1 * | 8/2004 | Muller | 345/467 |
| 6,853,980 B1 * | 2/2005 | Ying et al. | 705/27 |
| 6,901,427 B2 * | 5/2005 | Teshima | 709/203 |
| 7,155,476 B2 * | 12/2006 | Horiyama | 709/203 |
| 2002/0093683 A1 * | 7/2002 | Focazio et al. | 358/1.17 |
| 2004/0091176 A1 * | 5/2004 | Bai | 382/305 |

* cited by examiner

PRINTING SYSTEM THAT MANAGES FONT RESOURCES USING SYSTEM INDEPENDENT RESOURCE REFERENCES

CROSS REFERENCE TO RELATED APPLICATIONS

The present invention is related to the following U.S. Patent Application which is incorporated herein by reference: Ser. No. 10/696,953 entitled "Linking Font Resources in a Printing System" filed Oct. 30, 2003.

TECHNICAL FIELD

The present invention relates to the field of printing systems, and more particularly to a printing system that manages font resources using system independent references.

BACKGROUND INFORMATION

Computer systems can generate output information in several ways, including video output and "hard copy" or printed output. Although more and more output consists of evanescent video screens, a large amount of data is still printed on paper and other permanent media. Therefore, there is a need for efficiently describing printed data and then printing a hard copy page from the print description. The printing is often performed by high-speed, high-volume printing systems which receive streams of encoded print data and utilize "intelligent" printers that can store commands and data. Such encoded print streams often include data for many printed pages. For example, a telephone company might print all of its telephone bills for a specified week with a single print stream. Each page in the print stream may be a telephone bill for a particular customer.

In such printing and presentation systems, fonts may be stored in files in a separate resource database, commonly referred to as a "resource library." Such font resources enable a relatively small set of characters to be efficiently defined for printing and displaying. A font resource may define the encoding (mapping values, referred to as code points, to characters), the metrics (measurements of a character), glyphs (actual images of a character) and descriptive attributes of a collection of related characters. For example, a typical Latin font contains approximately three hundred (300) characters including alphabetic, numeric, symbolic, punctuation and special drawing characters. In another example, Unicode is a 16-bit character encoding standard that is capable of representing all of the world's languages, including non-Roman languages, such as Chinese, Japanese and Hindi. The Unicode standard can encode more than 1 million characters.

Typically, in printing and presentation systems, an application on a computer, commonly referred to as a client computer, may generate a printable and/or viewable data stream that contains page description information typically stored in a file. The page description information includes information used to print a document. Such information may include a reference to a font resource, e.g., True Type font. The font resource may be referenced by specifying the file name that contains the font resource in the resource library. Hence, the file name may be specified in the data stream generated by the application along with the character string to be printed using that font resource.

However, referencing font resources by file names is system dependent. For example, a font resource, e.g., TrueType, may be stored in file name #1 in one system but stored as a different file name, file name #2, in a different system. Hence, the application program must reference a font resource using different file names in different systems. If the application program references the font resource with the incorrect file name, then the font resource will not be able to be retrieved.

Also, there is the possibility that two different files may store the same resource. For example, the TrueType font resource may be installed initially in the resource library in a stand alone font file. The application program would then reference the stand alone font file using the file name that stores the TrueType font resource. The TrueType font resource may later be installed as part of a collection of fonts such as a TrueType Collection file. The application program would then have to be modified to reference the collection file with an index to the TrueType font reference.

Further, if there are changes to a resource file, then the user may have to build or buy a special purpose font. For example, Microsoft™ provides the ability for a user to add a character to a font resource provided the character appears in a special type of file used for extending TrueType fonts for user-defined characters. Such files have a .tte extension. However, if the user desires to add a character not found in the file, then the user may have to build or buy a special purpose font resource that incorporates the added character along with the base font resource. Similarly, if a customer wants to replace a character in the font resource because the character has an error, the customer is usually prevented from modifying the font resource due to the license from the manufacturer of the font resource. The customer may then have to build or buy a special purpose font resource that includes the additional or modified character as well as the other characters in that font resource. Furthermore, if a customer wants to delete a character in the font resource because the customer will not use the character, then the customer may have to build or buy a special purpose font resource that does not include the character the customer desires to delete. The application program would then have to be modified in order to reference the special purpose font resource. Hence, when there are changes to a resource file, the application may then have to be modified in order to select the correct file containing the correct font resource.

Therefore, there is a need in the art for a printing system with a system independent resource reference in the data stream. Further, there is a need in the art for a printing system that does not require any changes to the application if there are changes to the resource file.

SUMMARY

The problems outlined above may at least in part be solved in some embodiments by a table, referred to herein as a "resource access table," that stores for each base font resource a native name, e.g., full font name, a file name, a unique identification, e.g., object identifier, attributes, e.g., private or public resource, and possibly a link list used to identify any font resources that are linked to the base font resource. Since changes to the resource file such as updating a version of a font resource, changing the attributes of the font resource or changing the font resource's linked fonts, simply require an update to the resource access table, the data stream and the application program generating that data stream does not have to be changed.

In one embodiment of the present invention, a method for managing font resources using system independent references may comprise the step of receiving a character where the character is a modified character in a first base font resource or is a character to be deleted from the first base font resource. The method may further comprise creating a font resource that comprises the character in a file. The method may further comprise generating an identification associated with the created font resource. The method may further comprise creating an entry in a table establishing the created font resource as a second base font resource. The method may further comprise storing a native name of the created font resource and its associated file name and the identification in the entry.

In another embodiment of the present invention, a method for managing font resources using system independent references may comprise the step of installing a collection font resource where the collection font resource comprises a stand alone font resource. The method may further comprise generating an identification associated with the collection font resource. The method may further comprise creating an entry in a table for the stand alone font resource. The method may further comprise storing in the created entry a native name of the stand alone font resource along with the identification and a file name of the collection font resource.

In another embodiment of the present invention, a method for managing font resources using system independent references may comprise the step of receiving a native name identifying a font resource in a data stream. The method may further comprise searching a table for the received native name and its associated file name. The method may further comprise downloading a file referenced by the file name to a printer if the printer has not stored the file referenced by the file name.

In another embodiment of the present invention, a method for managing font resources may comprise the step of updating a font resource identified with a first identification where a table comprises an entry storing a native name identifying the font resource and its associated first identification. The method may further comprise generating a second identification associated with the updated font resource. The method may further comprise editing the table by replacing the first identification with the second identification.

In another embodiment of the present invention, a method for managing font resources using system independent references may comprise the step of receiving a native name identifying a font resource in a data stream. The method may further comprise searching a table for the received native name and its associated identification. The method may further comprise downloading a file referenced by the identification to a printer if the printer has not stored the file referenced by the identification.

In another embodiment of the present invention, a method for managing font resources using system independent references may comprise the step of receiving a character string and a native name identifying a font resource in a data stream. The method may further comprise searching a table for the received native name and its associated attributes where the associated attributes indicate if the font resource is a private or a public resource. The method may further comprise downloading a file referenced by the file name to a printer and allowing the printer to capture the resource if the resource is a public resource. The method may further comprise downloading the file referenced by the file name but not allowing the printer to capture the resource if the resource is a private resource.

The foregoing has outlined rather generally the features and technical advantages of one or more embodiments of the present invention in order that the detailed description of the invention that follows may be better understood. Additional features and advantages of the invention will be described hereinafter which may form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, computer program product and system for managing font resources using system independent references. In one embodiment of the present invention, a resource library may store a table, referred to herein as the "resource access table" that contains an entry for each base font resource. Each entry may include the following information on a base font resource: a native name, e.g., full font name, a file name, a unique identification, e.g., object identifier, attributes, e.g., private or public resource, and possibly a link list used to identify any font resources that are linked to the base font resource. Since changes to the resource file such as updating a version of a font resource, changing the attributes of the font resource or changing the font resource's linked fonts, simply require an update to the resource access table, the data stream and the application program generating that data stream does not have to be changed In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
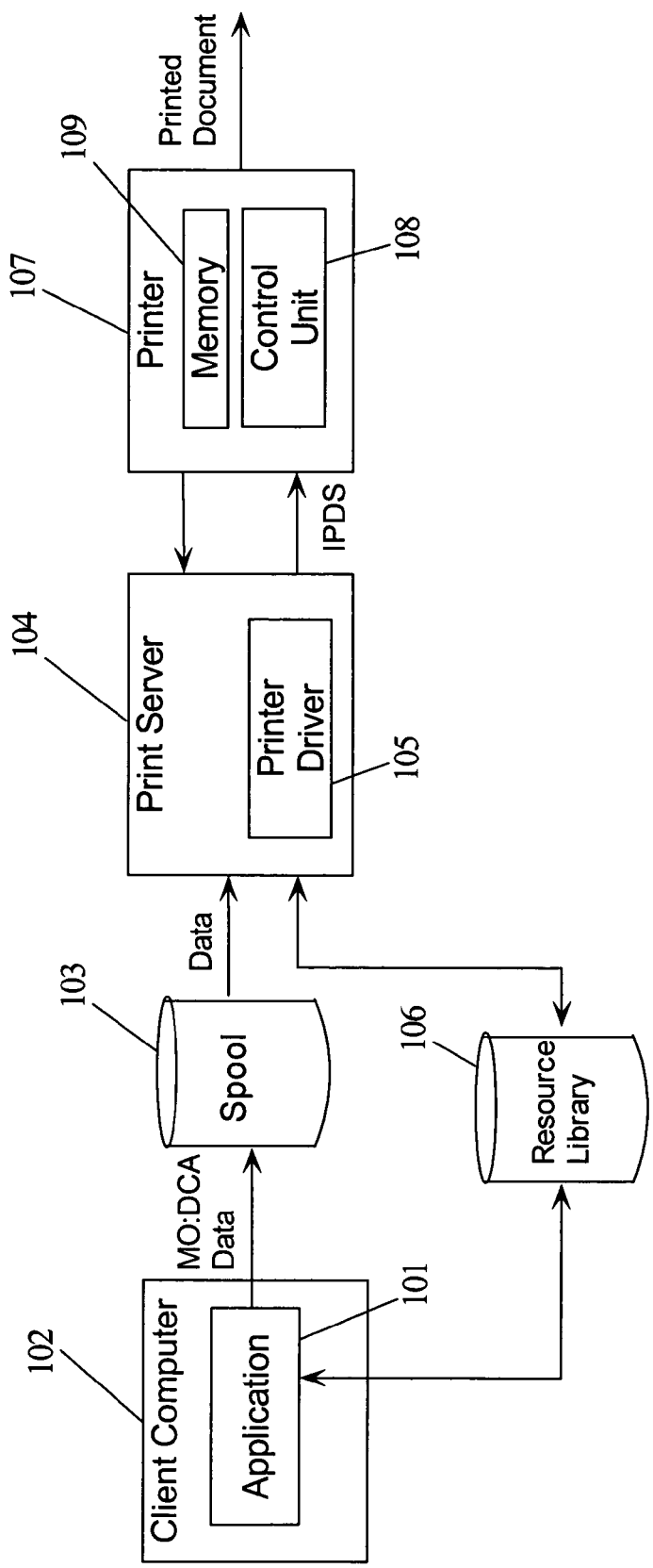
FIG. 1 illustrates a printing system in accordance with an embodiment of the present invention.

FIG. 1—Printing System

FIG. 1 illustrates an embodiment of the present invention of a printing system 100 for printing a document produced by an application program 101 (i.e., a "print document") on a client computer 102. A more detailed description of client 102 is described further below in association with FIG. 2. The application program 101 running on client 102 generates a data stream that is a formatted, platform and device independent logical description of the print document. One known specification of such a logical description of a data stream utilized for printing is known as MO:DCA (Mixed Object Document Content Architecture), described in detail in I.B.M. Mixed Object Document Content Architecture Reference number SC31-6802.

Printing system 100 further comprises a spool 103 for both receiving and spooling the data stream representing the print document from the application program 101. Once received by spool 103, the data stream is transmitted to a print server 104 that converts the data stream to a device specific data stream by means of a printer driver 105, and a resource library 106 containing resources, such as fonts, and print control objects that are required to print the data stream. Application program 101 may be configured to access and use resource library 106 to format the document. A more detail description of print server 104 is provided further below in association with FIG. 3. In the case where the MO:DCA printing format is used, the resulting data stream generated by print server 104 is called an Intelligent Printer Data Stream (IPDS). Use of the print control objects in resource library 106 in this manner is known in the art as "outboard formatting." Resource library 106 is utilized in this manner to tie the logical page description of the print document to a physical medium. Once the data stream is formatted, it is directed to a printer 107 for producing a printed document.

Printer 107 may have a control unit 108 with which print server 104 can communicate and an internal memory 109. The communication between print server 104 and printer 107 is bi-directional. For example, print server 104 may inquire of printer 107 whether a particular resource, such as a font, is resident in the printer memory 109. If the resource is not present, print server 104 may retrieve the font from resource database 106 and download it using the IPDS data stream into printer memory 109. The resource may then be available for future use. Subsequently, when print data that refers to the downloaded resource is received by printer 107, printer 107 will combine the resource with the data and provide the combination to a conventional Rasterizing Image Processor (called a "RIP", not shown in FIG. 1) which converts the data into a printable graphic image. A rasterizer program used to convert the data into a printable graphic image, as described in further detail below in association with FIGS. 7 and 9-10, may be stored in memory 109. Control unit 108 coupled to memory 109 may be configured to execute the instructions of the rasterizer program.

As stated the in the Background Information section, there is a need in the art for a printing system with a system independent resource references in the data stream. Further, there is a need in the art for a printing system that does not require any changes to the application if there are changes to the resource file. A printing system may use system independent resource references in the data stream without requiring changes to the application program if there are changes to a resource file by using a table, referred to herein as a resource access table, in resource library 106 that includes such information as a full font name, a file name, an identification and attributes associated with each base font resource as discussed further below in association with FIGS. 4-9. Prior to such a discussion, a discussion of client 102 and print server 104 is deemed appropriate.

FIG. 2—Client

Figure 2:
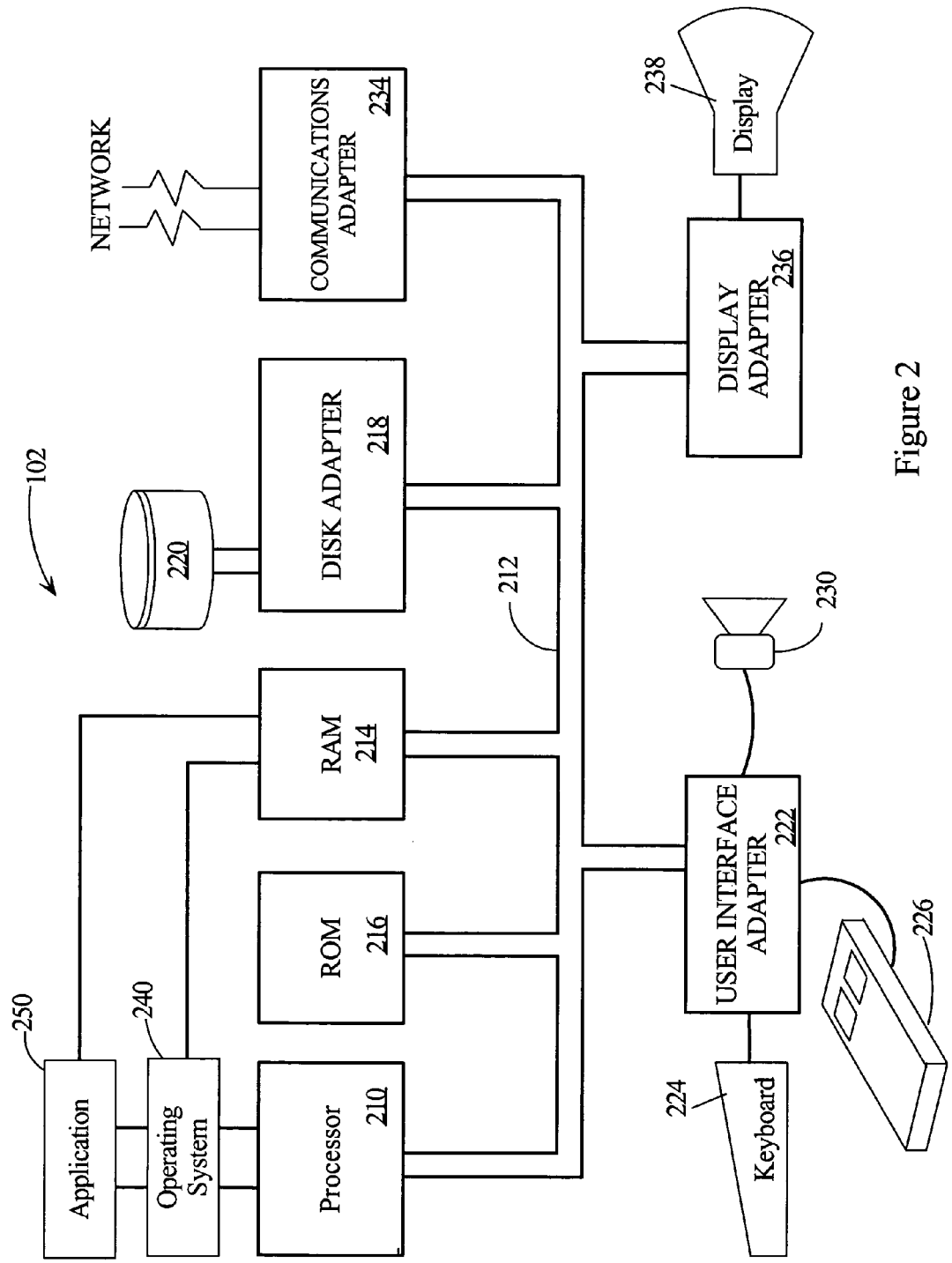
FIG. 2 illustrates an embodiment of the present invention of a client in the printing system.

FIG. 2 illustrates a typical hardware configuration of client 102 (FIG. 1) which is representative of a hardware environment for practicing the present invention. Referring to FIG. 2, client 102 may have a processor 210 coupled to various other components by system bus 212. An operating system 240, may run on processor 210 and provide control and coordinate the functions of the various components of FIG. 2. An application 250 in accordance with the principles of the present invention may run in conjunction with operating system 240 and provide calls to operating system 240 where the calls implement the various functions or services to be performed by application 250. Application 250 may include, for example, a font installer program configured to create/update and install a new/updated font resource in resource library 106 (FIG. 1) as well as to create and/or update entries in a resource access table as discussed further below in association with FIGS. 5-6 and 8. Application 250 may further include a program for generating a data stream that is a formatted, platform and a device independent logical description of the print document, e.g., a MO:DCA data stream.

Read only memory (ROM) 216 may be coupled to system bus 212 and include a basic input/output system ("BIOS") that controls certain basic functions of client 102. Random access memory (RAM) 214 and disk adapter 218 may also be coupled to system bus 212. It should be noted that software components including operating system 240 and application 250 may be loaded into RAM 214 which may be client's 102 main memory. Disk adapter 218 may be an integrated drive electronics ("IDE") adapter that communicates with a disk unit 220, e.g., disk drive. It is noted that the program of the present invention that creates/updates and installs a new/updated font resource in resource library 106 (FIG. 1) as well as creates and/or updates entries in a resource access table, as discussed further below in association with FIGS. 5-6 and 8, may reside in disk unit 220 or in application 250. It is further noted that the program of the present invention that generates a data stream that is a formatted, platform and device independent logical description of the print document, e.g., a MO:DCA data stream, may reside in disk unit 220 or in application 250.

Returning to FIG. 2, communications adapter 234 may also be coupled to system bus 212. Communications adapter 234 may interconnect bus 212 with an outside network enabling client 102 to communicate with spool 103 (FIG. 1), print server 104 (FIG. 1) and resource library 106 (FIG. 1). Input/Output devices may also be connected to system bus 212 via a user interface adapter 222 and a display adapter 236. Keyboard 224, mouse 226 and speaker 230 may all be interconnected to bus 212 through user interface adapter 222. Event data may be inputted to client 102 through any of these devices. A display monitor 238 may be connected to system bus 212 by display adapter 236. In this manner, a user is capable of inputting to client 102 through keyboard 224 or mouse 226 and receiving output from client 102 via display 238 or speaker 230.

Implementations of the invention include implementations as a computer system programmed to execute the method or methods described herein, and as a computer program product. According to the computer system implementations, sets of instructions for executing the method or methods may be resident in the random access memory 214 of one or more computer systems configured generally as described above. Until required by client 102, the set of instructions may be stored as a computer program product in another computer memory, for example, in disk unit 220. Furthermore, the computer program product may also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 3:
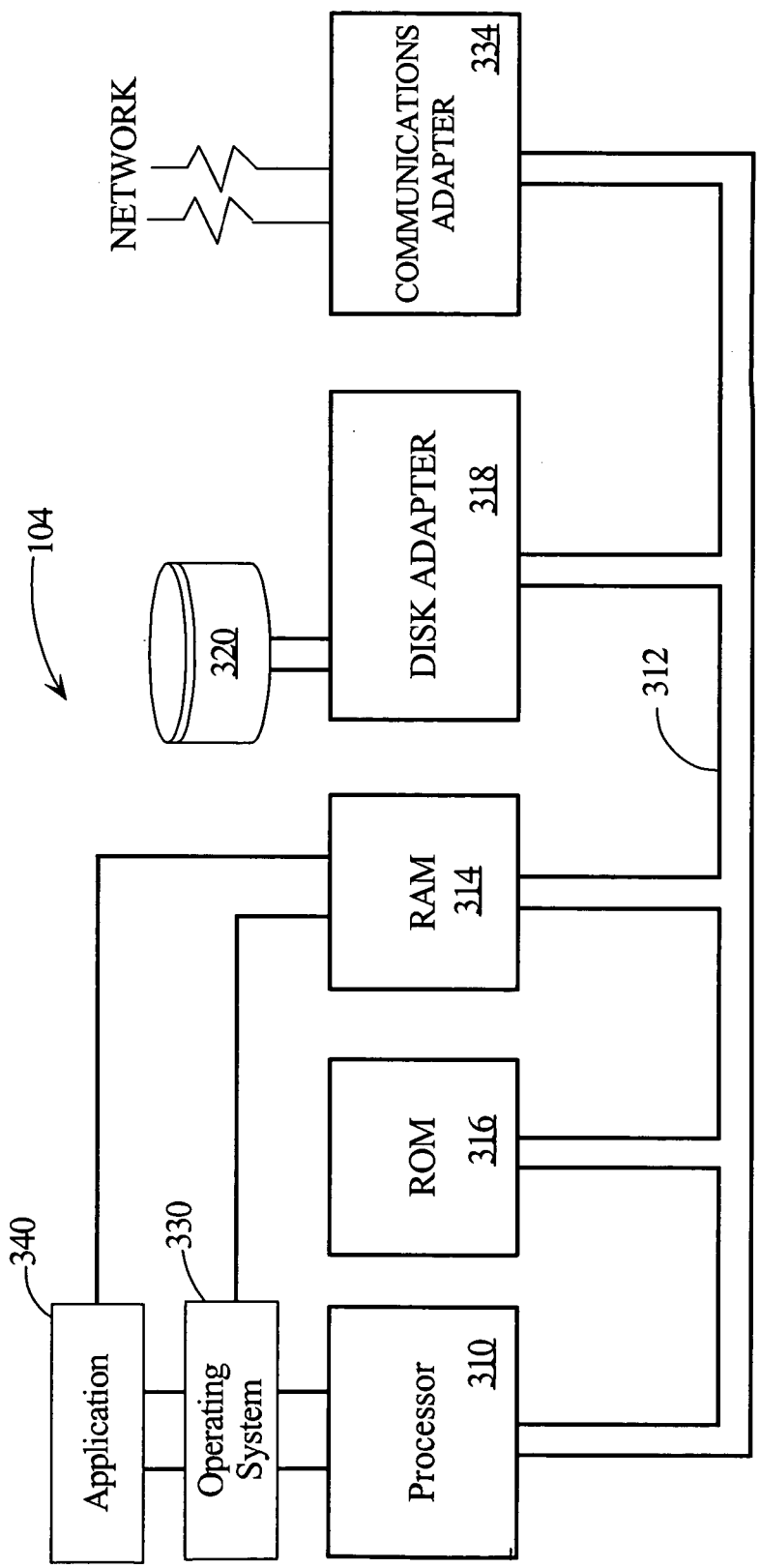
FIG. 3 illustrates an embodiment of the present invention of a print server in the printing system.

FIG. 3—Print Server

FIG. 3 illustrates an embodiment of the present invention of print server 104 (FIG. 1). Referring to FIG. 3, print server 104 may comprise a processor 310 coupled to various other components by system bus 312. An operating system 330 may run on processor 310 and provide control as well as coordinate the function of the various components of FIG. 3. An application 340 in accordance with the principles of the present invention may run in conjunction with operating system 330 and provide calls to operating system 330 where the calls implement the various functions or services to be performed by application 340. An application 340 may include, for example, a program for converting the data stream received from client 102 (FIGS. 1 and 2) to a device specific data stream, e.g., IPDS data stream, to be transmitted to printer 107 (FIG. 1). Application 340 may further include a printer driver 105. Read only memory (ROM) 316 may be coupled to system bus 312 and include a Basic Input/Output System ("BIOS") that controls certain basic functions of print server 104. Random access memory (RAM) 314, disk adapter 318 and communications adapter 334 may also be coupled to system bus 312. It should be noted that software components including operating system 330 and application 340 may be loaded into RAM 314 which may be the main memory for print server 104. Disk adapter 318 may be an integrated drive electronics ("IDE") adapter that communicates with a disk unit 320. It is noted that the program of the present invention in print server 104 that converts the data stream received from client 102 to a device specific data stream, e.g., IPDS data stream, may reside in disk drive 320 or in application 340. Communications adapter 334 may enable print server 104 to communicate with printer 107 (FIG. 1), client 102 (FIGS. 1 and 2), resource library 106 (FIG. 1) and spool 103 (FIG. 1).

Implementations of the invention include implementations as a computer system programmed to execute the method or methods described herein, and as a computer program product. According to the server implementations, sets of instructions for executing the method or methods may be resident in the random access memory 314 of one or more computer systems configured generally as described above. Until required by print server 104, the set of instructions may be stored as a computer program product in another computer memory, for example, in disk drive 320 (which may include a removable memory such as an optical disk or floppy disk for eventual use in disk drive 320). Furthermore, the computer program product may also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

As stated above, print server 104 may access resource library 106 (FIG. 1) having print control functions to generate an IPDS data stream. Resource library 106 may further be configured to store a table, referred to herein as the "resource access table," configured to store such information as a full font name, a file name, an identification and attributes associated with each base font resource as discussed below in association with FIG. 4.

Figure 4:
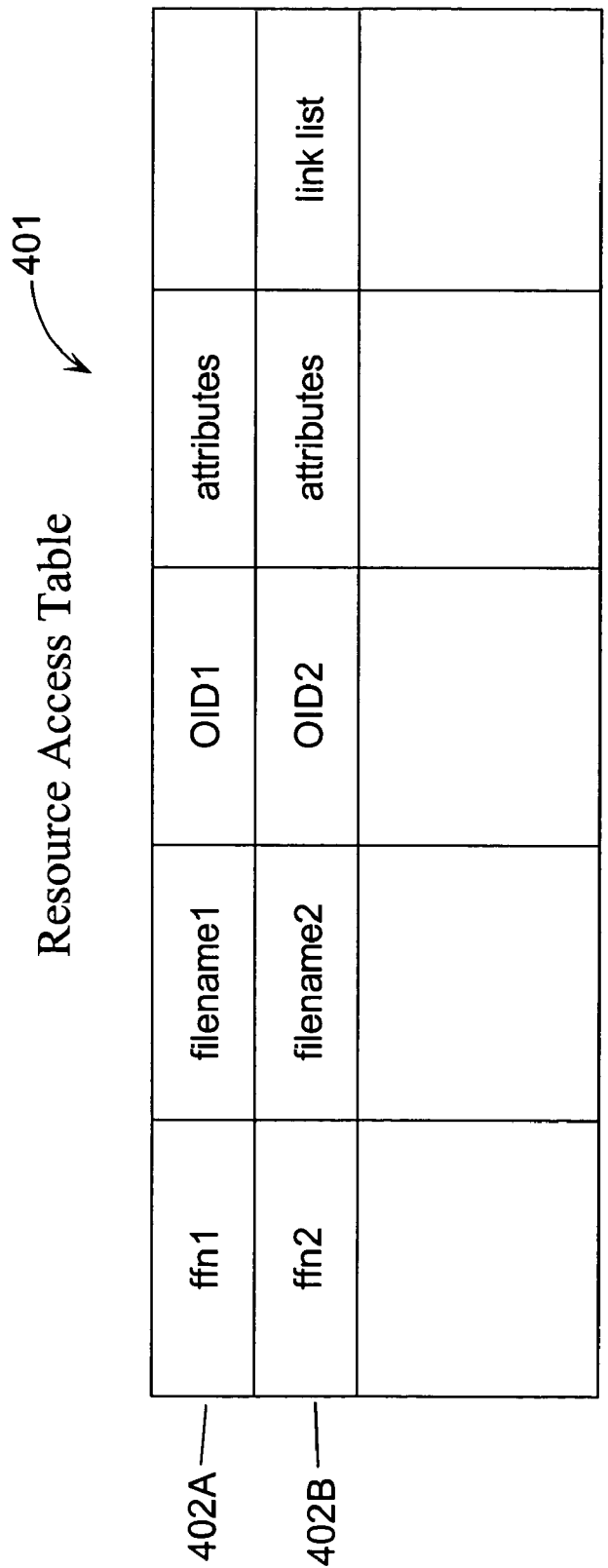
FIG. 4 illustrates an embodiment of the present invention of a resource access table in the resource library.

FIG. 4—Resource Access Table

FIG. 4 illustrates an embodiment of the present invention of a resource access table 401. Resource access table 401 may comprise a plurality of entries 402A-B. Entries 402A-B may collectively or individually be referred to as entries 402 or entry 402, respectively. It is noted that resource access table may comprise any number of entries 402 and that FIG. 4 is illustrative. It is further noted that the discussion below of the elements of information stored in entry 402 is not to be interpreted as exhaustive. Entry 402 may store any number of elements of information.

Each entry 402 in resource access table 401 may store information regarding a particular font resource, e.g., Arial TrueType font resource, which is referred to herein as a "base font resource." The base font resource may be identified by a native name, such as a full font name, as indicated by "ffn" in each entry 402. For example, the base font resource associated with entry 402A is identified by the full font name of ffn1. The base font resource associated with entry 402B is identified by the full font name of ffn2.

Each entry 402 may further include a file name indicating the file where the base font resource is stored in resource library 106. For example, the base font resource associated with entry 402A is stored in file name 1 in resource library 106. The base font resource associated with entry 402B is stored in file name 2 in resource library 106.

Each entry 402 may further include an identification, referred to herein as the "object identifier." An object identifier may refer to a unique identification used to identify a particular base font resource. The purpose of the object identifier is to be provide an identifier for the resource that is more unique than the native name. In one embodiment, the value of the object identifier may be calculated using a checksum algorithm. For example, the base font resource associated with entry 402A is identified by the object identifier of OID1. The base font resource associated with entry 402B is identified by the object identifier of OID2.

Each entry 402 may further include information on the attributes on the base font resource. For example, the attributes may include information as to whether the base font resource is "public" or "private." A "public" font resource may refer to a resource that may be allowed to be transferred to printer 107 (FIG. 1) and then captured by printer 107 as explained in greater detail further below in association with FIG. 10. That is, the font resource is available for other application programs and print jobs to use and access. A "private" font resource may refer to a resource that may be transferred to printer 107 but not captured by printer 107 as explained in greater detail further below in association with FIG. 10. That is, the font resource is not available for other application programs and other print jobs to use and access.

Each entry 402 may further include what is referred to as a "link list" if there are any font resources "linked" to the base font resource. A "linked resource" may refer to a resource that includes different and/or additional character(s) with respect to a base font resource and is "linked" to or associated with another resource, e.g., base font resource, thereby allowing the linked resource and the associated resource to be treated as a single font resource. A "link list" may contain a listing of one or more resources that are linked to a base font resource or other "linked resources." Additional details regarding linked resources and link lists are disclosed in U.S. application Ser. No. 10/696,953, filed on Oct. 30, 2003, entitled "Linking Font Resources in a Printing System," which is hereby incorporated herein by reference in its entirety.

The link list may further include information ("link information") as to how these linked font resources are linked to other resources (linked or base font resource). Further, if the link list contains a listing of multiple linked font resources, then a linked font resource may be linked to the preceding listed linked font resource. For example, if the link list contained an ordered listing of linked font resource #1 followed by linked font resource #2, then linked font resource #2 is linked to linked font resource #1. In one embodiment, the linked resources may be identified by full font names in the link list. As will be explained in greater detail below, entry 402 may include a parameter that is used to reverse the order of the linking in the link list.

As stated in the Background Information section, if there are changes to a resource file, then the user may have to build or buy a special purpose font. For example, if a user wants to add a character to a font resource, referred to as the base font resource, then the user may have to build or buy a special purpose font resource that incorporates the added character along with the base font resource. Similarly, if a customer wants to replace a character in the font resource because the character has an error, the customer is usually prevented from modifying the font resource due to the license from the manufacturer of the font resource. The customer may then have to build or buy a special purpose font that includes the additional or modified character as well as the other characters in that font resource. Furthermore, if a customer wants to delete a character in the font resource because the customer will not use the character, then the customer may have to build or buy a special purpose font that does not include the character the customer desires to delete. The application program would then have to be modified in order to reference the special purpose font resource. Hence, when there are changes to a resource file, the application may then have to be modified in order to select the correct file containing the correct font resource. A method for combining the creation of a font resource that includes a character to be added, modified or deleted from a base font resource without building or buying a special purpose font with the generation, update and validation of entries 402 in resource access table 401 is described below in association with FIG. 5. Further, a method for combining the installation of a collection font resource with the generation, update and validation of entries 402 in resource access table 401 is described below in association with FIG. 6. By using the methods of FIGS. 5 and 6, application program 101 (FIG. 1) does not have to be changed when there are changes to a resource file.

Figure 5:
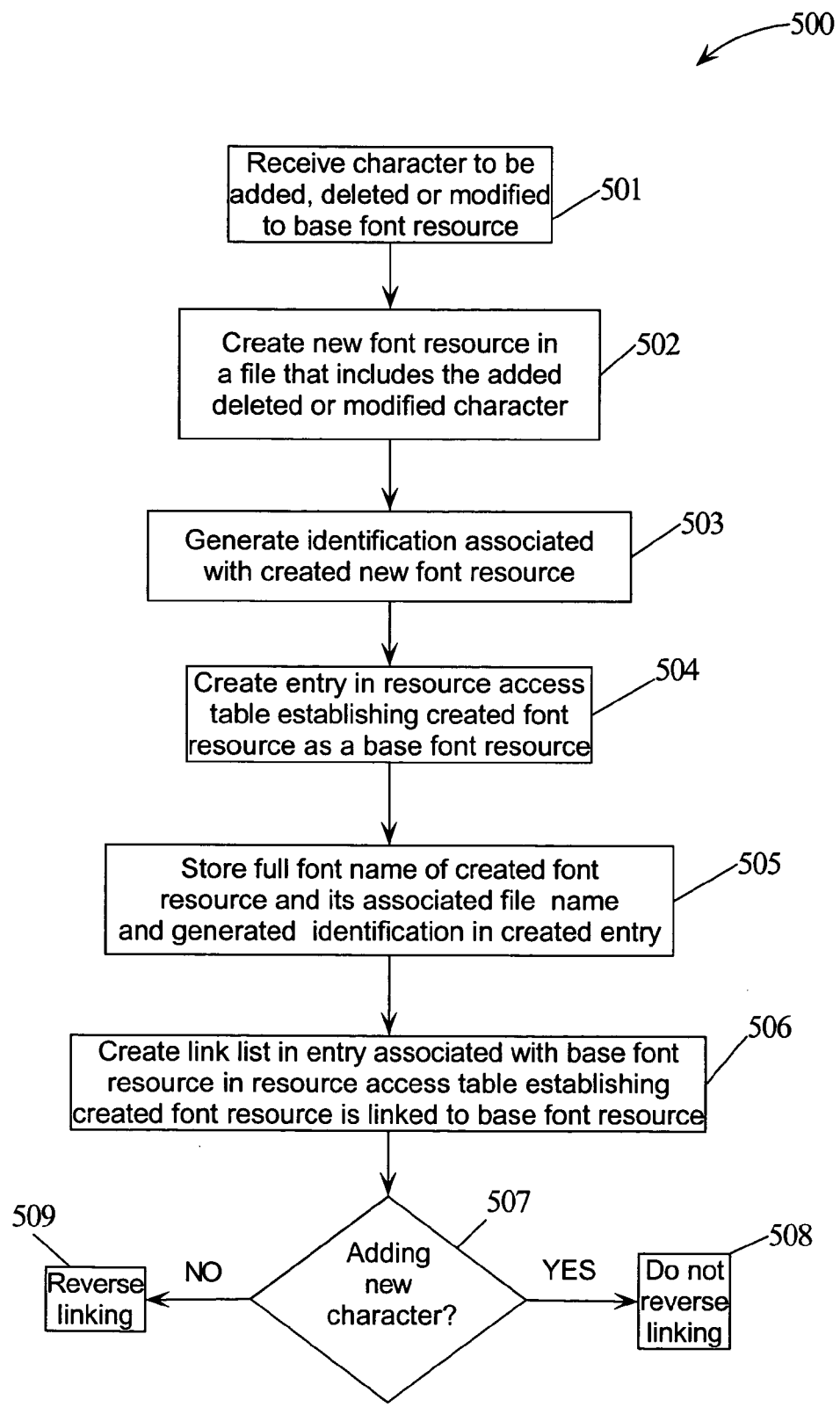
FIG. 5 is a flowchart of a method for combining the creation of a font resource with the generation, update and validation of entries in the resource access table in accordance with an embodiment of the present invention.

FIG. 5—Method for Combining the Creation of a Font Resource With the Generation, Update and Validation of Entries in Resource Access Table FIG. 5 is a flowchart of one embodiment of the present invention of a method 500 for combining the creation of a font resource that includes a character to be added, modified or deleted from a base font resource without building or buying a special purpose font with the generation, update and validation of entries 402 in resource access table 401.

Referring to FIG. 5, in conjunction with FIGS. 1-4, in step 501, the font installer program of client 102 receives a character to be effectively added to, deleted from or modified in a base font resource, e.g., TrueType. For example, a user of client 102 may desire to add a logo, e.g., company logo, to the base font resource, e.g., TrueType. In another example, a user of client 102 may desire to delete a character, e.g., frown face, from the base font resource. In another example, a user of client 102 may desire to modify the base font resource by replacing a character that has an error with the correct character.

In step 502, the font installer program of client 102 creates a new font resource that includes the added, deleted or modified character, e.g., logo. The created font resource includes a mapping table (not shown) and a glyph table (not shown). A mapping table may be configured to store one or more glyph indexes that are used to index into a "glyph table." An entry in mapping table may be indexed using, what is referred to herein as a "code point," that is stored in the IPDS data transmitted to printer 107 (FIG. 1). A code point may be a value that is used to identify a particular character. A glyph table may be configured to store one or more glyphs or characters of a particular font resource. Additional details regarding mapping and glyph tables are disclosed in U.S. application Ser. No. 10/696,953, filed on Oct. 30, 2003, entitled "Linking Font Resources in a Printing System," which is hereby incorporated herein by reference in its entirety.

In step 503, the font installer program of client 102 generates an identification associated with the created new font resource. In one embodiment, the font installer program of client 102 generates an object identifier, as discussed above, using a checksum algorithm.

In step 504, the font installer program of client 102 creates a new entry 402 in resource access table 401 identifying the font resource created in step 502. In step 505, the font installer program of client 102 stores the full font name of the created font resource and its associated file name and identification, e.g., object identifier, generated in step 503, in the created entry 402.

In step 506, the font installer program of client 102 further creates a link list in the entry 402 associated with the base font resource thereby linking the created font resource with the base font resource.

In step 507, the font installer program of client 102 determines if the character received in step 501 is a character to be added to the base font resource. If the character received in step 501 is a character to be added to the base font resource, then, in step 508, the font installer program of client 102 indicates in the entry 402 associated with the base font resource to not reverse the order of the linking. In one embodiment, the font installer program of client 102 may indicate to not reverse the order of the linking by not setting a bit. For example, if the character received in step 501 is a character to be added to the base font resource, then the font installer program of client 102 indicates in the entry 402 associated with the base font resource to not reverse the order of the linking. Consequently, the created font resource containing the added font resource is linked with the base font resource.

If, however, the character received in step 501 is not a character to be added to the base font resource, then, in step 509, the font installer program of client 102 indicates in the entry 402 associated with the base font resource to reverse the order of the linking. In one embodiment, the font installer program of client 102 may indicate to reverse the order of the linking by setting a bit. Consequently, the base font resource becomes linked to the font resource created in step 501. For example, if the character received in step 501 is a modified character or a character to be deleted from the base font resource, then the font installer program of client 102 indicates in the entry 402 associated with the base font resource to reverse the order of the linking. Consequently, the base font resource containing the character to be deleted or modified is linked with the created font resource.

It is noted that even though linking a created font resource with a base font resource is described with reference to using resource access table 401 that linking may be accomplished via inline data. That is, linking a created font resource with a base font resource may be accomplished via commands inserted in the data, e.g., MO:DCA, transmitted between client 102 and print server 104, instead of using resource access table 401. It is further noted that embodiments accomplishing linking through inline data would fall within the scope of the present invention.

It is further noted that method 500 may include other and/or additional steps that, for clarity, are not depicted. It is further noted that method 500 may be executed in a different order than presented and that the order presented in the discussion of FIG. 5 is illustrative. It is further noted that certain steps in method 500 may be executed in a substantially simultaneous manner.

Figure 6:
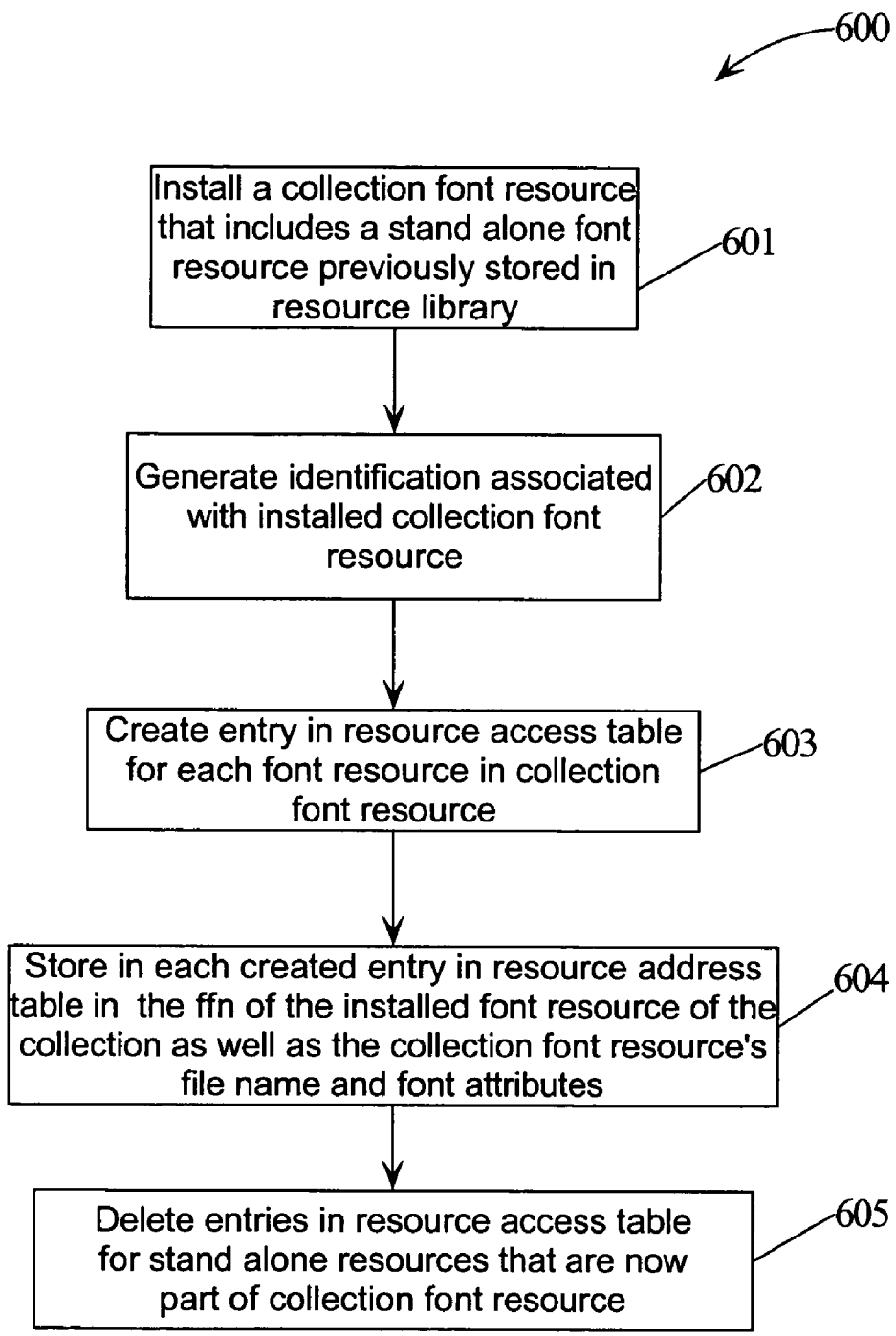
FIG. 6 is a flowchart of a method for combining the installation of a collection font resource with the generation, update and validation of entries in the resource access table in accordance with an embodiment of the present invention.

FIG. 6—Method for Combining the Installation of a Collection Font Resource with the Generation, Update and Validation of Entries in Resource Access Table FIG. 6 is a flowchart of one embodiment of the present invention of a method 600 for combining the installation of a collection font resource with the generation, update and validation of entries 402 (FIG. 4) in resource access table 401 (FIG. 4).

Referring to FIG. 6, in conjunction with FIGS. 1-4, in step 601, the font installer program of client 102 installs a collection font resource, e.g., TrueType Collection file, that includes a stand alone font resource, e.g., Arial TrueType, previously stored in resource library 106.

In step 602, the font installer program of client 102 generates an identification associated with the installed collection font resource. In one embodiment, the font installer program of client 102 generates an object identifier, as discussed above, using a checksum algorithm.

In step 603, the font installer program of client 102 creates an entry 402 in resource access table 401 for each font resource in the collection font resource. That is, each font resource in the collection font resource may be treated as a "base font resource."

In step 604, the font installer program of client 102 stores in each entry 402, corresponding to a font resource in the collection font resource, a full font name, e.g., Arial TrueType, the identification generated in step 602, the collection font resource's file name and font attributes, e.g., public or private.

In step 605, each entry 402 associated with each stand alone resource that is now part of the collection font resource is deleted from resource access table 401.

By associating each font resource in the collection font resource with an identification associated with the collection font resource, application program 101 does not have to be changed when a stand alone resource is replaced with a collection font resource that contains the stand alone resource as discussed below in association with FIG. 7. Application program 101 does not have to be changed as the packaging of the resource—from stand alone to collection—is changed. Similarly, application program 101 does not have to be changed when a font resource has been updated as discussed below in association with FIGS. 8-9. Similarly, application program 101 does not have to be changed when attributes of a font resource are changed as discussed below in association with FIG. 10.

It is further noted that method 600 may include other and/or additional steps that, for clarity, are not depicted. It is further noted that method 600 may be executed in a different order presented and that the order presented in the discussion of FIG. 6 is illustrative. It is further noted that certain steps in method 600 may be executed in a substantially simultaneous manner.

Figure 7:
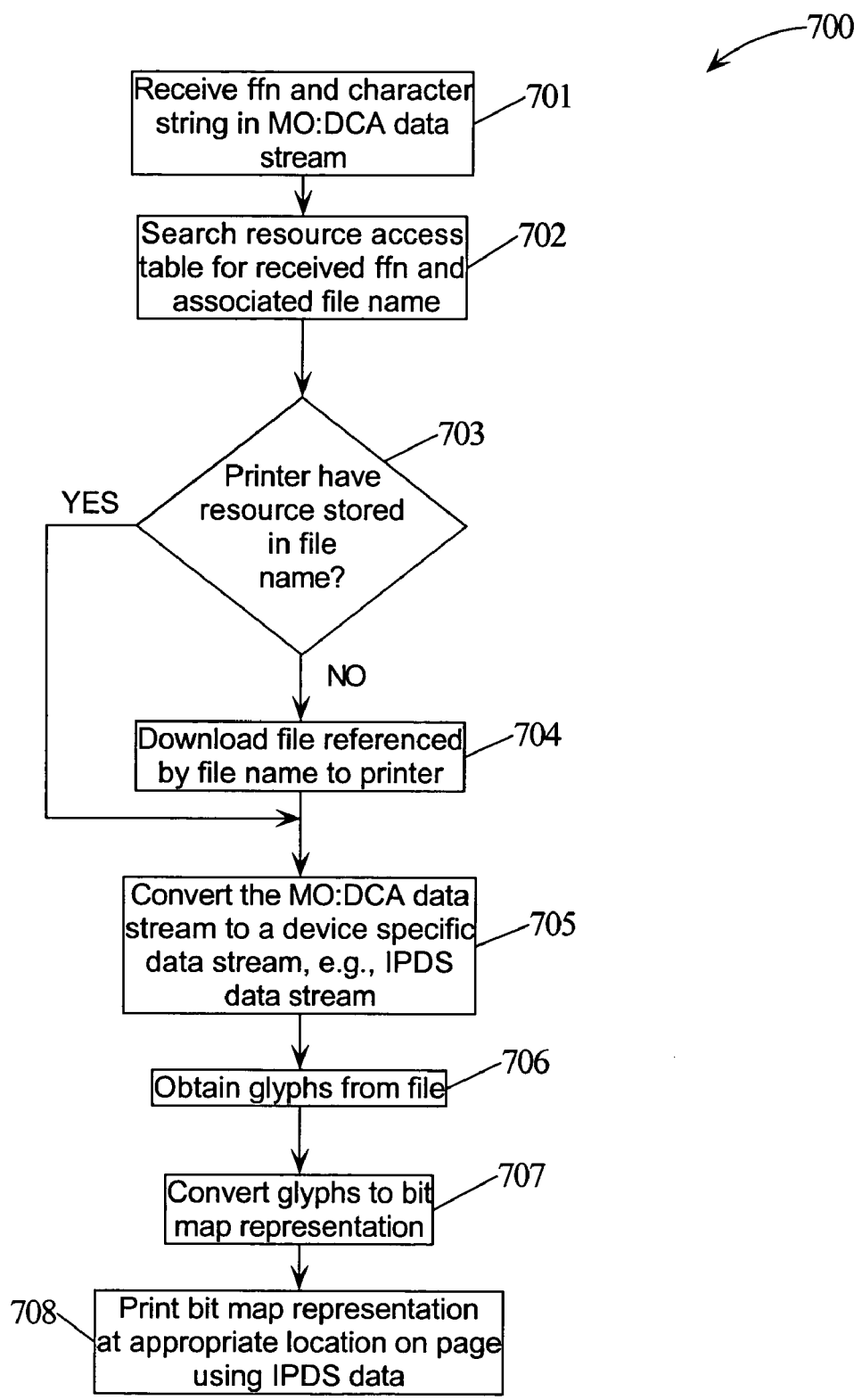
FIG. 7 is a flowchart of a method for retrieving the appropriate font resource using the name identifier in the data stream in accordance with an embodiment of the present invention.

FIG. 7—Method for Retrieving Appropriate Font Resource Using Name Identifier in Data Stream FIG. 7 is a flowchart of one embodiment of the present invention of a method 700 for retrieving appropriate font resources using the name identifier in the data stream.

Referring to FIG. 7, in conjunction with FIGS. 1-4, in step 701, printer driver 105 receives a name identifier, e.g., full font name, as well as a character string to be printed using the font resource identified by the name identifier in the MO:DCA data stream from application 101 after it has been spooled by spool 103.

In step 702, printer driver 105 searches resource access table 401 in resource library 106 for an entry 402 with the received name identifier and its associated file name. For example, if printer driver 105 receives the full font name, ffn1, then printer driver 105 searches resource table 401 for an entry 402 with the full font name of ffn1. Upon identifying an entry 402 with the full font name of ffn1, printer driver 105 obtains the file name, e.g., file name 1, of where that font resource is stored in resource library 106.

In step 703, printer driver 105 determines if printer 107 has the font resource, e.g., ffn1, identified in step 701.

If printer 107 does not have stored the file, e.g., file name 1, of the font resource printer driver 105 received in step 701, then, in step 704, printer driver 105 downloads the file referenced by the file name, e.g., file name 1, of the font resource printer driver 105 received in step 701 to printer 107.

Upon printer driver 105 downloading the file referenced by the file name of the font resource printer driver 105 received in step 701 to printer 107 or if printer 107 does have stored the file, e.g., file name 1, of the font resource printer driver 105 received in step 701, then, in step 705, printer driver 105 converts the MO:DCA data stream to a device specific data stream, e.g., IPDS data stream, to be understood by printer 107.

In step 706, the rasterizer program in printer 107 obtains the glyphs in the file corresponding to the characters in the character string received by printer driver 105 in step 701.

In step 707, the rasterizer program converts the glyphs obtained to a bit map representation. In step 708, printer 107 prints the bit map representation at the appropriate location on the page using the IPDS data.

It is noted that method 700 may include other and/or additional steps that, for clarity, are not depicted. It is further noted that method 700 may be executed in a different order presented and that the order presented in the discussion of FIG. 7 is illustrative. It is further noted that certain steps in method 700 may be executed in a substantially simultaneous manner.

Figure 8:
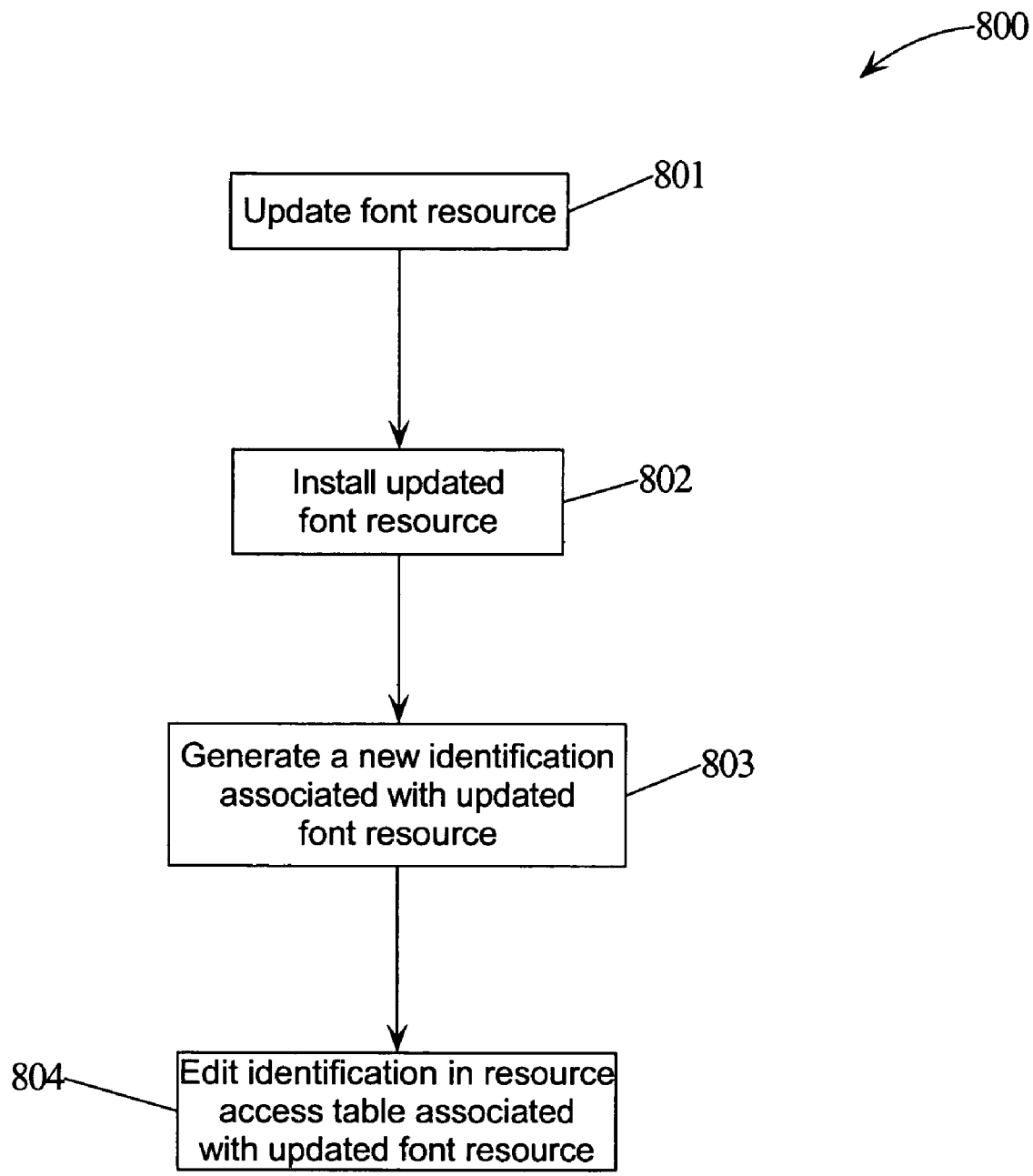
FIG. 8 is a flowchart of a method for combining the installation of an updated font resource with the updating of an entry in the resource access table in accordance with an embodiment of the present invention.

FIG. 8—Method for Combining the Installation of an Updated Font Resource with the Updating of an Entry in Resource Access Table FIG. 8 is a flowchart of one embodiment of the present invention of a method 800 for combining the installation of an updated font resource with the updating of an entry 402 (FIG. 4) in resource access table 401 (FIG. 4).

Referring to FIG. 8, in conjunction with FIGS. 1-4, in step 801, the font installer program of client 102 updates a font resource. For example, the font installer program of client 102 may update a font resource by replacing an older version of a font resource with a newer version of the font resource.

In step 802, the font installer program of client 102 installs the updated font resource in resource library 106.

In step 803, the font installer program of client 102 generates a new identification, e.g., object identifier, associated with the updated font resource. As stated above, each font resource has a unique identification, e.g., object identifier, associated with it. Upon updating a font resource, a new unique identification is generated to be associated with the updated font resource. For example, an older version of a font resource may be associated with one unique identification and the newer version of the font resource may be associated with another unique identification. By assigning different identifications to different versions, the appropriate version of the font resource will be used as discussed further below in association with FIG. 9.

In step 804, the font installer program of client 102 edits the identification, e.g., object identifier, associated with the font resource which was updated in step 801 in resource access table 401 by replacing the prior identification with the identification generated in step 803. For example, referring to FIG. 4, if the font resource with the full font name of ffn1 was updated, then the font installer program may replace the object identifier of OID1 in entry 402A with the object identifier generated in step 802, e.g., OID3. Since the changes to the identifier, e.g., object identifier, are managed via resource access table 401, there are no required changes to the application program 101. Hence, changes to a resource file, such as by updating the resource file, do not require changes to the application program 101.

It is noted that method 800 may include other and/or additional steps that, for clarity, are not depicted. It is further noted that method 800 may be executed in a different order presented and that the order presented in the discussion of FIG. 8 is illustrative. It is further noted that certain steps in method 800 may be executed in a substantially simultaneous manner.

Figure 9:
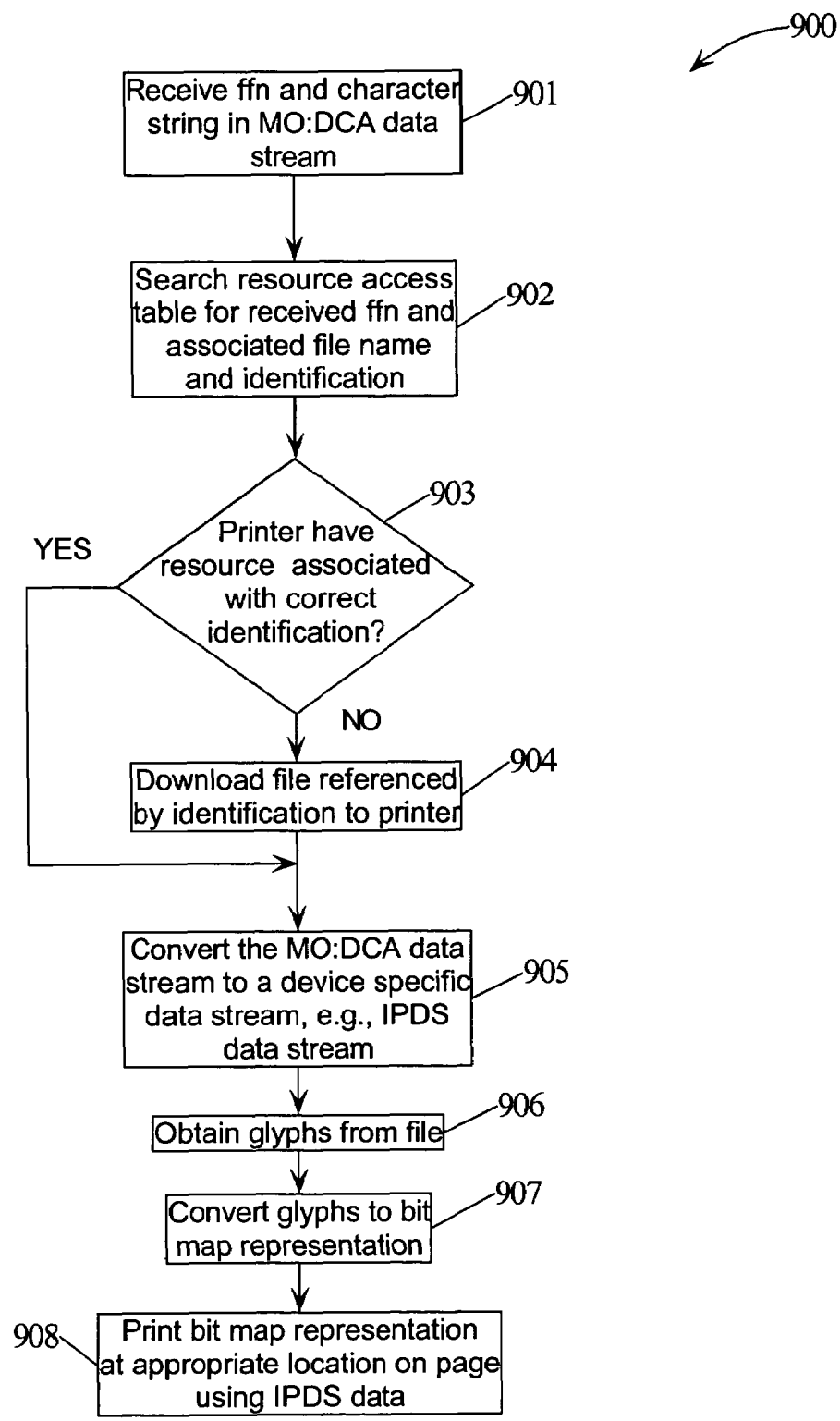
FIG. 9 is a flowchart of a method for retrieving the appropriate font resource using the updated identification in the resource access table in accordance with an embodiment of the present invention.

FIG. 9—Method for Retrieving Appropriate Font Resource Using Updated Identification in Resource Access Table FIG. 9 is a flowchart of one embodiment of the present invention of a method 900 for retrieving appropriate font resources using the appropriate identification, e.g., object identifier, obtained in resource access table 401 (FIG. 4).

Referring to FIG. 9, in conjunction with FIGS. 1-4, in step 901, printer driver 105 receives a name identifier, e.g., full font name, as well as a character string to be printed using the font resource identified by the name identifier in the MO:DCA data stream from application 101 after it has been spooled by spool 103.

In step 902, printer driver 105 searches resource access table 401 in resource library 106 for an entry 402 with the received name identifier and its associated file name and unique identification, e.g., object identifier. For example, if printer driver 105 receives the full font name, ffn1, then printer driver 105 searches resource table 401 for an entry 402 with the full font name of ffn1. Upon identifying an entry 402 with the full font name of ffn1, printer driver 105 obtains the file name, e.g., file name 1, of where that font resource is stored in resource library 106 as well as its unique identification, e.g. OID1.

In step 903, printer driver 105 determines if printer 107 has the font resource, e.g., ffn1, identified in step 901. In one embodiment, printer driver 105 may query printer 107 to determine if printer 107 has stored in its memory the file name, e.g., file name 1, retrieved in step 902 along with its associated identification, e.g., OID1, as indicated in resource access table 401.

If printer 107 does not have stored the file, e.g., file name 1, with the correct identification, e.g., OID1, of the font resource printer driver 105 received in step 901, then, in step 904, printer driver 105 downloads the file referenced by the file name, e.g., file name 1, of the font resource printer driver 105 received in step 901 to printer 107. In this manner, printer 107 will not be using an outdated version of a font resource. If printer 107 contains an outdated version of a font resource, then printer 107 will download the latest version of the font resource since the identification, e.g., object identifier, in resource access table 401 will not match the identification printer 107 possesses for that font resource.

Upon printer driver 105 downloading the file referenced by the file name of the font resource printer driver 105 received in step 901 to printer 107 or if printer 107 does have stored the file, e.g., file name 1, along with its correct identification, e.g., object identifier, of the font resource printer driver 105 received in step 901, then, in step 905, printer driver 105 converts the MO:DCA data stream to a device specific data stream, e.g., IPDS data stream, to be understood by printer 107.

In step 906, the rasterizer program in printer 107 obtains the glyphs in the file corresponding to the characters in the character string received by printer driver 105 in step 901.

In step 907, the rasterizer program converts the glyphs obtained to a bit map representation. In step 908, printer 107 prints the bit map representation at the appropriate location on the page using the IPDS data.

It is noted that method 900 may include other and/or additional steps that, for clarity, are not depicted. It is further noted that method 900 may be executed in a different order presented and that the order presented in the discussion of FIG. 9 is illustrative. It is further noted that certain steps in method 900 may be executed in a substantially simultaneous manner.

Figure 10:
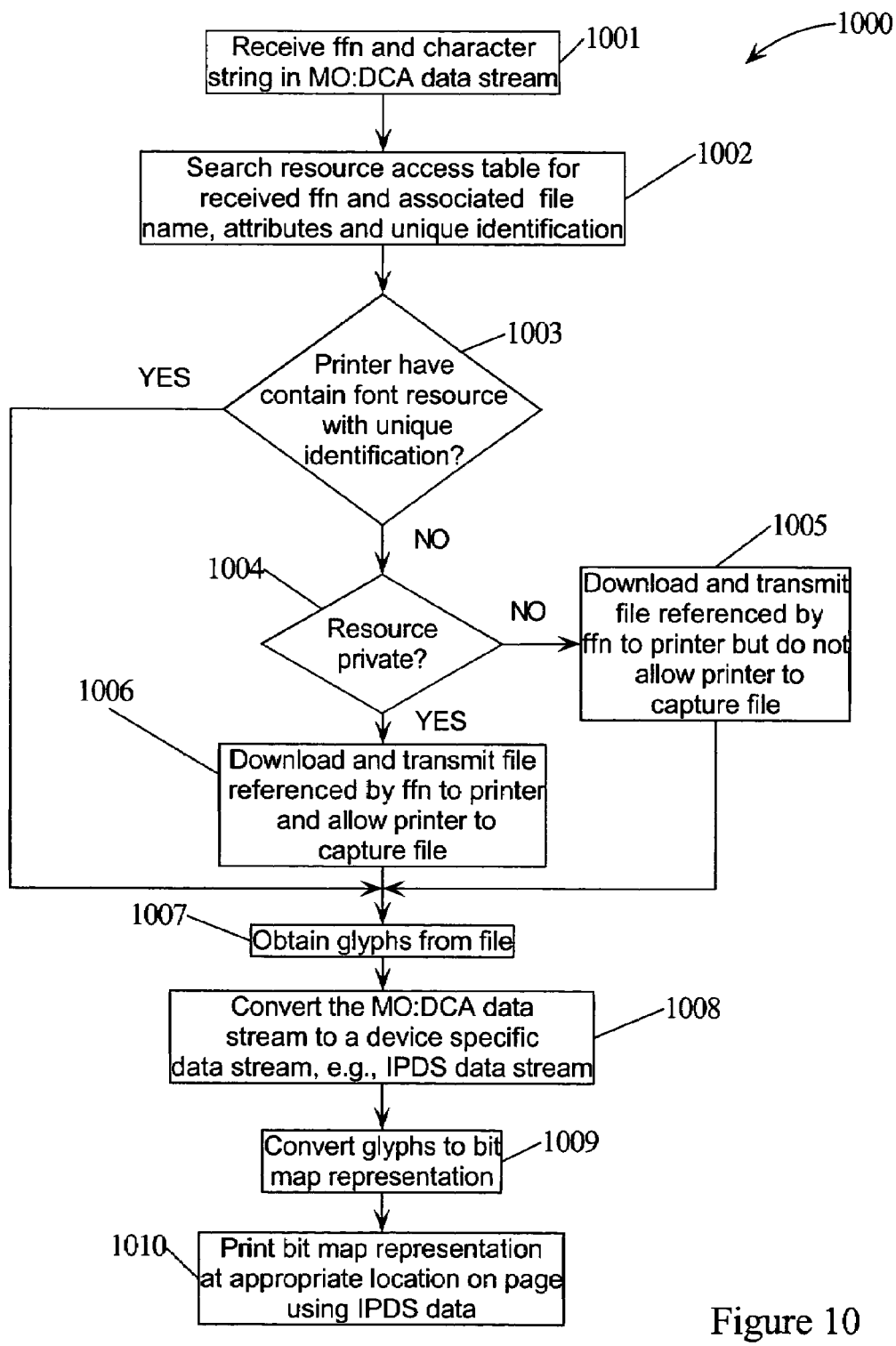
FIG. 10 is a flowchart of a method for determining whether to allow a printer to capture a downloaded font resource depending on whether the font resource is a public or private resource in accordance with an embodiment of the present invention.

FIG. 10—Method for Determining Whether to Download Font Resource to Printer Depending on Whether Font Resource is a Public or Private Resource FIG. 10 is a flowchart of one embodiment of the present invention of a method 1000 for determining whether to download a font resource to printer 107 (FIG. 1) depending on whether the font resource is a public or private resource.

Referring to FIG. 10, in conjunction with FIGS. 1-4, in step 1001, printer driver 105 receives a name identifier, e.g., full font name, as well as a character string to be printed using the font resource identified by the name identifier in the MO:DCA data stream from application 101 after it has been spooled by spool 103.

In step 1002, printer driver 105 searches resource access table 401 in resource library 106 for an entry 402 with the received name identifier and its associated file name, attributes, e.g., public or private font resource, and unique identification, e.g., object identifier. For example, if printer driver 105 receives the full font name, ffn1, then printer driver 105 searches resource table 401 for an entry 402 with the full font name of ffn1. Upon identifying an entry 402 with the full font name of ffn1, printer driver 105 obtains the file name, e.g., file name 1, of where that font resource is stored in resource library 106 as well as its attributes, e.g. public or private font resource, and unique identification, e.g., object identifier.

In step 1003, printer driver 105 queries printer 107 to determine if printer 107 contains the font resource associated with the unique identification, e.g., object identifier.

If printer 107 does not contain the font resource associated with the unique identification, then in step 1004, printer driver 105 determines if the font resource, e.g., ffn1, identified in step 1001 is a private resource. As stated above, a "public" font resource may refer to a font resource that is available for other application programs and print jobs to use and access. A "private" font resource may refer to a font resource that is not available for other application programs and print jobs to use and access. In one embodiment, printer driver 105 may determine if the font resource identified in step 1001 is a private resource based on the attributes obtained in resource access table 401 in step 1002.

If printer driver 105 determines that the font resource identified in step 1001 is a private resource based on the attributes obtained in step 1002, then, in step 1005, printer driver 105 downloads and transmits the file referenced by the file name, e.g., file name 1, of the font resource received in step 1001 to printer 107 but does not allow printer 107 to capture the file by its unique identifier across print job boundaries. In one embodiment, printer driver 105 transmits a command in the IPDS data stream to printer 107 to delete the received font resource after using the font resource for the current printer job. By transmitting a command to delete the received font resource after using the font resource for the current printer job, printer 107 does not capture the resource, i.e., does not retain the file of the resource to be used by other print jobs.

It is noted that even if the font resource is marked as "public" but the font installer flags it as a "private" resource in resource access table 401, the resource will be deemed to be private. That is, the determination as to whether the font resource is a public or private resource is determined from resource access table 401 and not how the font resource is marked. In this manner, changes to the attributes of a font resource are managed via resource access table 401 and do not require changes to the application program 101. Hence, changes to a resource file, such as by changing the attributes of the font resource, do not require changes to the application program 101.

If, however, printer driver 105 determines that the font resource identified in step 1001 is a public resource based on the attributes obtained in step 1002, then, in step 1006, printer driver 105 downloads and transmits the file referenced by the file name, e.g., file name 1, of the font resource received in step 1001 to printer 107 and allows printer 107 to capture the file by its unique identifier across print job boundaries. In one embodiment, printer driver 105 does not transmit a command in the IPDS data stream to printer 107 to delete the received font resource after using the font resource for the current printer job. By not transmitting such a command, printer 107 may retain the file of the received font resource to be used by other print jobs.

Upon printer driver 105 downloading and transmitting the file referenced by the file name of the font resource printer driver 105 received in step 1001 to printer 107 in steps 1005, 1006 or if printer 107 already contained the font resource associated with the unique identification, e.g., object identifier, then in step 1007, the rasterizer program in printer 107 obtains the glyphs in the file corresponding to the characters in the character string received by printer driver 105 in step 1001.

In step 1008, printer driver 105 converts the MO:DCA data stream to a device specific data stream, e.g., IPDS data stream, to be understood by printer 107.

In step 1009, the rasterizer program converts the glyphs obtained to a bit map representation. In step 1010, printer 107 prints the bit map representation at the appropriate location on the page using the IPDS data.

It is noted that method 1000 may include other and/or additional steps that, for clarity, are not depicted. It is further noted that method 1000 may be executed in a different order presented and that the order presented in the discussion of FIG. 10 is illustrative. It is further noted that certain steps in method 1000 may be executed in a substantially simultaneous manner.

Although the system, method and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A system, comprising:
   a client operable for installing font resources and configured to generate a first data stream, wherein the first data stream comprises:
     page description information for printing a document; and
     native names of the installed font resources;
   a resource library of font resources coupled to the client, the resource library including a resource table configured to map the native names of the installed font resources on the client to font resources in the resource library and allow the client to modify the resource table to change the mapping of the native names to the font resources;
   a print server coupled to the resource library and configured to receive the first data stream, process the first data stream using the resource table to map the native names in the first data stream to a first font resource in the resource library, and generate a second data stream from the first data stream;
   has been changed to the print server further configured to process the first data stream using the resource table to map the native names of the first data stream to a second font resource in the source library, and generate a third data stream from the first data stream, wherein the resource table has been modified by the client after generating the first data stream to change the mapping between native names and font resources; and
   a printer configured to receive the second and third data stream generated from the print server.

2. The system as recited in claim 1, wherein the client further comprises:
   circuitry operable for receiving a character to be effectively added to, deleted from, or modified in a first base font resource;
   circuitry operable for creating a new font resource that includes the received character in a file;
   circuitry operable for generating an identification associated with the new font resource;
   circuitry operable for creating an entry in the resource table establishing the new font resource as a second base font resource; and circuitry operable for storing a native name of the new font resource and its associated file name and the identification in the created entry.

3. The system as recited in claim 2, wherein the client further comprises:

circuitry operable for creating a link list in an entry in the resource table associated with the first base font resource to link the new font resource to the first base font resource;

circuitry operable for indicating in the entry in the table associated with the first base font resource to not reverse linking of the first base font resource to the new font resource if the received character is a character to be added; and circuitry operable for indicating in the entry in the table associated with the first base font resource to reverse linking of the first base font resource to the new font resource if the received character is a character to be modified or deleted.

4. The system as recited in claim 1, wherein the client further comprises:

circuitry operable for installing a collection font resource, wherein the collection font resource comprises a stand alone font resource;

circuitry operable for generating an identification associated with the collection font resource;

circuitry operable for creating an entry in the table for the stand alone font resource; and circuitry operable for storing in the created entry a native name of the stand alone font resource along with the identification and a file name of the collection font resource.

5. The system as recited in claim 1, wherein the print server further comprises:

circuitry operable for receiving a native name identifying a font resource in the first data stream;

circuitry operable for searching the table for the received native name and its associated file name; and circuitry operable for downloading a file referenced by the file name to the printer if the printer has not stored the file referenced by the file name.

6. The system as recited in claim 1, wherein the client further comprises:

circuitry operable for updating a font resource identified with a first identification, wherein the resource table comprises an entry storing a native name identifying the font resource and its the first identification;

circuitry operable for generating a second identification associated with the updated font resource; and circuitry operable for editing the resource table by replacing the first identification with the second identification.

7. The system as recited in claim 1, wherein the print server further comprises:

circuitry operable for receiving a native name identifying a font resource in the first data stream;

circuitry operable for searching the resource table for the received native name and its associated identification; and circuitry operable for downloading a file referenced by the identification to the printer if the printer has not stored the file referenced by the identification.

8. The system as recited in claim 1, wherein the print server further comprises:

circuitry operable for receiving a character string and a native name identifying a font resource in the first data stream;

circuitry operable for searching the resource table for the received native name and its associated attributes, wherein the associated attributes indicate if the font resource is a private or a public resource;

circuitry operable for downloading and transmitting a file referenced by the file name to the printer;

circuitry operable for allowing the printer to capture the file if the resource is a public resource; and circuitry operable for not allowing said printer to capture the file if the resource is a private resource.

* * * * *

UNITED STATES PATENT AND TRADEMARK OFFICE
CERTIFICATE OF CORRECTION

| | | |
|---|---|---|
| PATENT NO. | : 7,403,297 B2 | Page 1 of 1 |
| APPLICATION NO. | : 10/697521 | |
| DATED | : July 22, 2008 | |
| INVENTOR(S) | : Engelman et al. | |

It is certified that error appears in the above-identified patent and that said Letters Patent is hereby corrected as shown below:

At column 16, line 46, the text "has been changed to the printer server further configured to" should read --the printer server further configured to--.

Signed and Sealed this

Eleventh Day of November, 2008

JON W. DUDAS
*Director of the United States Patent and Trademark Office*